United States Patent [19]

Jennings et al.

[11] Patent Number: 5,232,496
[45] Date of Patent: Aug. 3, 1993

[54] PROCESS FOR PRODUCING IMPROVED BUILDING MATERIAL AND PRODUCT THEREOF

[75] Inventors: Hamlin M. Jennings, Evanston, Ill.; Simon K. Hodson, Santa Barbara, Calif.

[73] Assignee: E. Khashoggi Industries, Santa Barbara, Calif.

[21] Appl. No.: 418,027

[22] Filed: Oct. 10, 1989

Related U.S. Application Data

[63] Continuation-in-part of Ser. No. 234,267, Aug. 19, 1988, Pat. No. 5,061,319, and Ser. No. 234,819, Aug. 19, 1988, Pat. No. 4,944,595.

[51] Int. Cl.$^5$ .................................................. C04B 7/02
[52] U.S. Cl. ................................. 106/713; 106/638; 106/814; 106/819
[58] Field of Search ............... 106/682, 638, 713, 814, 106/819

[56] References Cited

U.S. PATENT DOCUMENTS

| | | | |
|---|---|---|---|
| 4,234,344 | 11/1980 | Tinsley et al. | 106/682 |
| 4,383,862 | 5/1983 | Dyson | 106/682 |
| 4,415,366 | 11/1983 | Copening | 106/682 |

FOREIGN PATENT DOCUMENTS

| | | | |
|---|---|---|---|
| 0323390 | 2/1972 | U.S.S.R. | 106/682 |
| 490820 | 8/1938 | United Kingdom | 106/682 |
| 2086748 | 5/1982 | United Kingdom | 106/682 |
| 2192392a | 1/1988 | United Kingdom . | |

OTHER PUBLICATIONS

G. J. Verbeck, "Carbonation of Hydrated Portland Cement", Portland Cement Association (1958).
J. Am. Cer. Soc., vol. 69, No. 8, 614–618 (1986).
J. Am. Cer. Soc., vol. 70, No. 8, 743–749 (1987).
E. M. M. G. Niel, "Supplementary Paper II-117 The Influence of Alkali-Carbonate on the Hydration of Cement," Fourth International Symposium on Cement, pp. 472–489 (1968).
"Design and Control of Concrete Mixtures", Portland Cement Association, 13th edition (1988).

*Primary Examiner*—Mark L. Bell
*Assistant Examiner*—Anthony J. Green
*Attorney, Agent, or Firm*—Workman Nydegger & Jensen

[57] ABSTRACT

The process for producing a paste of improved quality. In one aspect, the process comprises allowing hydraulic cement and water to mix sufficiently to reach early age equilibrium, exposing the mixing water and cementitious material to a carbon source selected from the group consisting of $CO_2$, CO, carbonate salts and mixtures thereof, and then allowing the resulting mixture to again reach early age equilibrium.

139 Claims, 4 Drawing Sheets

PROCESS FOR PRODUCING IMPROVED BUILDING MATERIAL AND PRODUCT THEREOF

BACKGROUND OF THE INVENTION

1. Related Cases

This is a continuation-in-part of U.S. patent application Ser. No. 07/234,267, filed Aug. 19, 1988, U.S. Pat. No. 5,061,319 entitled "Process For Producing Cement Building Material" and U.S. patent application Ser. No. 07/234,819, filed Aug. 19, 1988, U.S. Pat. No. 4,944,595, entitled "Apparatus For Producing Cement Building Material", both assigned to Concrete Technology Corporation.

2. Field of the Invention

The present invention relates generally to the production of building materials formed from hydraulic cement, clays and other materials. More particularly, the present invention relates to a process for improving the quality of cementitious products.

3. Description of Related Art

In the construction and building industry, concrete is generally defined as a mixture of two components—aggregates and paste. Mortar is defined as a mixture of sand and paste. Aggregates include without limitation rock, fibers, steel balls and other non-cementitious materials. The paste, which typically includes cementitious material and water, binds the aggregates into a rocklike mass ("concrete") as the paste hardens. The paste hardens because of a chemical hydration reaction between hydraulic cement and water. In this regard, the technology of concrete is discussed in S.H. Kosmatka, "Design and Control of Concrete Mixtures," 13th Edition, Portland Cement Association, 1988; see also S. Mindess and J. Francis Young, "Concrete," Prentice-Hall, Inc. (1981).

The reactions by virtue of which cement becomes a bonding agent take place in a water-cement paste. In other words, in the presence of water and calcium, the silicates, aluminates, etc. form products of hydration, which in time produce a firm and hard mass—the "hardened cement paste." See A. M. Neville "Properties of Concrete", page 18 (1968).

The term used to describe the stiffening of the cement paste during the hydration process that follows initial cement and water mixing is "setting", although the definition of the stiffness of the paste which is considered set is somewhat arbitrary. Broadly speaking, setting refers to a change from a fluid to a rigid state. Although during setting the paste acquires some strength, for practical purposes it is convenient to distinguish setting from hardening, which refers to the gain of strength of a set cement paste.

The typical process that constitutes hydration is often referred to as "massing", followed by "initial set", followed by "final set" of the cement paste. Initial set is defined by a final stiffening of the paste and/or concrete mix after which further mixing or agitation is damaging. A hydraulic cement-based material may be mixed without damage to its ultimate properties up to the onset of initial set.

The setting process is indicated by temperature changes in the cement paste. Initial set typically corresponds to the onset of a rapid rise in temperature.

The quality of concrete depends to a great extent on the quality of the paste used in its formation. For example, the quality of the paste influences characteristics of the concrete such as its compressive and flexural strength, and its ability to resist weathering and cracking.

When a hydraulic cement is first mixed with water, there is a rapid dissolution of the calcium, silica and/or alumina components (CaO, $SiO_2$ and $Al_2O_3$, etc.). During this time the pH or alkalinity of the aqueous mixture of cement and water rises to a highly alkaline level (typically in excess of 11.0). After this initial rapid reaction period, [1]/the rate of chemical change is very slow and remains slow until the beginning of "initial set". Although the onset of initial set can vary a great deal, it typically occurs at approximately 1–6 hours after initial mixing of the cement and water. The period of slow reaction will hereinafter be referred to as "early age equilibrium" that can be identified at an early age after initial mixing of the cement and water. The conditions of early age equilibrium are sometimes referred to in the prior art as the induction period. It is understood that the exact characteristics of true chemical equilibrium are not fully satisfied by this definition, but the reaction rate is sufficiently slow to be easily distinguished from the initial reaction rates and the subsequent reaction rates. Furthermore, this "early age equilibrium" period is of great significance in the processing and handling of cementitious materials (see with respect to early age equilibrium reaction rate constants, etc.), E. M. Gartner and H. M. Jennings, "Thermodynamics of Calcium Silicate Hydrates and Their Solutions", J. Am. Ceram. Soc., 70[10] 743-49 (1987); and H. M. Jennings, "Aqueous Solubility Relationships for Two Types of Calcium Silicate Hydrate", J. Am. Ceram. Soc., 69[8] 614–18 (1986).

[1]/ The reaction rate can be followed by monitoring the change in pH or by monitoring the change in concentrations of the early age components.

The most common cementitious material used in the production of paste is a hydraulic cement known as Portland cement. The four principal chemical constituents of Portland cement are tricalcium silicate, dicalcium silicate, tricalcium aluminate and tetracalcium aluminoferrite. Other cementitious products include fly ash, silica fume and slag cement.

One limitation of hardened cementitious products, such as concrete, is the occurrence of weathering or cracking when carbon dioxide present in the air penetrates the cementitious product and reacts with hydrated components present therein to form carbonates. This "post-hydration" carbonation reaction often produces shrinkage which, in turn, leads to cracking. Generally, the depth of the carbonation reaction is very shallow in dense, high quality cementitious products, and therefore only the surface of these products is affected. However, carbonation is significantly increased in cementitious products having a high water-cement ratio and/or a porous paste.

To improve the quality of cementitious products, it has long been known in the art to intentionally expose hydrating cementitious materials to carbonation during the curing process. For example, after mixing and processing is completed and after the cementitious product is poured into a mold, it has been taught that by deliberately exposing the cementitious product to carbon dioxide, irreversible shrinkage may be induced. In cases where carbon dioxide exposure is intended, the processed cementitious product is poured into a mold, and the mold placed in an autoclave having a carbon dioxide enriched atmosphere. Initially, the carbon dioxide only reaches the surface of the cementitious product. After several days of exposure and well after final set, and depending upon the thickness of the product, the carbon dioxide may penetrate throughout the product. Thus, using such technique, future shrinkage of the resulting "pre-shrunk" product due to exposure to the atmosphere may be reduced. [See, e.g., G. J. Verbeck, *Carbonation of Hydrated Portland Cement*, ASTM Special Technical Publication No. 205 (1958)].

It has been recognized that the presence of carbonates such as $KCO_3$, $CaCO_3$ and $NaCO_3$ in the initial concrete mix may retard, in small quantities (for example, 0.2% by weight), or accelerate, in larger quantities (for example 1%-10% by weight), the rate of curing of the paste component of cementitious products. See Egide M. M. G. Niel, "Supplementary Paper II-117 The Influence of Alkali-Carbonate on the Hydration of Cement," 4th Tokyo International Symposium on Cement at pages 472-486 (1968). To produce such changes in curing rates, it is known to directly add cement to a solution of sodium carbonate dissolved in water and thereafter begin mixing or to add the carbonate salt upon the onset of mixing. Unfortunately, the effect on the rate of cure using carbonate additives at the onset of mixing is unpredictable. Furthermore, carbonate additives have been shown to have a negative effect on the compressive strength of the final product (typically 12 hours after mixing).

It is also known that tap water typically contains from 0.0017-0.0042% by volume $CO_2$, and that air typically contains from 0.033-1.0% by volume $CO_2$.

SUMMARY OF THE INVENTION

The present invention is directed to a process for producing a cement building material of improved strength, handling characteristics and overall performance. One aspect of the process of the present invention includes mixing water and hydraulic cement in the presence of a carbon source selected from the group consisting of $CO_2$, CO, carbonate salts and mixtures thereof after the mixed cement and water have reached early age equilibrium and then subsequently allowing the resulting mixture to again reach early age equilibrium, with these steps all occurring prior to initial set of the hydrated cement material. Carbonate salts are those which under the mixing conditions release $CO_2$, $CO_3^-$ or $CO_3^-$ ions into the liquid phase of the mixing cement and water. In another aspect of the present invention, the process includes exposing mixing water and hydraulic cement to a carbon source selected from the group consisting of $CO_2$, CO and mixtures thereof prior to the initial set of the hydrated cement material. Such processes result in the cement/water mixture having additional components of carbon having oxidation states greater than O.[2]/

[2]/Carbon source in all aspects of the present invention is intended to mean an amount in excess of that present in the constituents prior to processing, including cement, water, any admixtures and the atmosphere contiguous with the mixing cement, water and any admixtures.

A comparison between the compressive strength of cured conventional paste and cured paste produced by the process of the present invention shows the cured paste produced by the process of the present invention to be significantly stronger. In addition, the tensile strength, bonding strength, toughness, freeze thaw resistance and/or Young's Modulus are also improved.

Further, the paste resulting from the inventive process has a superior aggregate-bonding capability and reduced permeability. Building materials incorporating the paste also show a superior resistance to the deleterious affects of natural carbonation.

Still further, the new cement based materials produced according to the present invention have the following advantages over wood, plastic, metal and ceramic materials now being used in certain applications:

Low cost
Resistance to water
Fireproof
Environmentally stable
Environmentally compatible
Formed at low temperature

DETAILED DESCRIPTION OF THE INVENTION

The following description is of the best presently contemplated mode of carrying out the invention. This description is made for the purpose of illustrating the general principles of the invention and should not be taken in a limiting sense. The scope of the invention is best determined by reference to the appended claims.

In one aspect of the process of the present invention, the process includes producing a paste by (1) allowing hydraulic cement and water to reach early age equilibrium, (2) exposing the mixing water and hydraulic cement to a carbon source, and (3) allowing the cement, water and carbon source to again reach early age equilibrium, with all of these steps occurring prior to the initial set, and with the carbon source being selected from the group consisting of $CO_2$, CO, carbonate salts and mixtures thereof. In another aspect of the present invention, the process includes exposing mixing water and hydraulic cement to a carbon source selected from the group consisting of $CO_2$, CO and mixtures thereof prior to initial set of the hydrated cement material. It should be appreciated that in addition to hydraulic cement, other cementitious materials which can be added and processed according to the present invention include fly ash, silica fume and slag cement.

After the water and cementitious material have been exposed to the carbon source for a predetermined time sufficient to allow the pH to drop, the resulting mixture may be allowed to gel as discussed further below. Thereafter the gelled paste can be further processed.

It has been observed that for increased strength to be obtained, the hydraulic cement and water often must continue to mix after the carbon source is added and at least until the mixture reaches early age equilibrium. If such mixing is stopped too early, significant increases in strength often do not occur, although other properties are improved such as reduced bleeding and shrinkage.

Typically, it takes about 30 seconds to 5 minutes of mixing for hydraulic cement and water to reach early age equilibrium. This time period may change depending upon the vigor of the mixing; the more vigorous the dioxide enriched air and carbon monoxide enriched air in such.

Likewise, after the mixture has been exposed to the carbon source, it takes a few seconds to a few minutes to again reach early age equilibrium, depending upon the vigor of the mixing.

In one preferred embodiment, the hydraulic cement is Portland cement including one or more of the following compounds: tricalcium silicate, dicalcium silicate, tricalcium aluminate and tetracalcium aluminoferrite. The Portland cement is in a powdered form and when mixed with water forms a cementitious paste. The cement to water ratio can range from 0.1 to about 20, with 0.2 to 10 preferred, and with 0.3 to 3.0 more preferred.

The amount of "carbon source" exposed to the mixing cement and water should be above that normally present in the paste as a result of conventional mixing. For example, in a conventional mortar-type 2 c.f. capacity drum mixer rotated at 15-20 rpm, with a 0.40 cement to water ratio, the amount of carbon in the paste after 5 minutes of mixing was about 0.058% by weight; whereas the present invention caused an increased concentration of carbon above 0.058% by weight in the paste. In this regard, the present invention includes combining cement and water in the initial mixing process with $CO_2$ in a quantity greater than that present in the cement, water, any admixtures and atmosphere contiguous with the mixing cement and water.

To obtain improved strength, it is preferred that the carbon source such as $CO_2$ be added to mixing cement and water after such mixture reaches early age equilibrium. On the other hand if the carbon source such as $CO_2$ is added initially other improved characteristics of the paste are obtained including stability, gelling, and reduced bleeding, among others.

The preferred carbon source exposed to the mixing water and Portland cement is carbon dioxide, although other carbon sources include, without limitation, carbon dioxide enriched air and carbon monoxide enriched air in such amounts as to increase the amount of carbon in the paste above that amount present in the cement before mixing. If the mixing water and cement is first allowed to reach early age equilibrium before the addition of the carbon source as in the first aspect of the present invention, then carbonate salts are another carbon source. Carbonate salts are intended to mean those which under the conditions of mixing cement, water and any admixtures release $CO_2$ or $CO_3^-$, or $CO_3^-$, or $CO_3^=$ ions into the liquid phase of the mixture, and include without limitation $KCO_3$, $CaCO_3$, and $NaCO_3$. (For convenience, the carbon source selected from the group consisting of $CO_2$, CO, carbonate salts and mixtures thereof shall be referred to as "Group I Carbon Sources" and the Group I Carbon Sources without carbonate salts shall be referred to as "Group II Carbon Sources.")

In one embodiment of the present invention, water, cement and air are mixed together by high shear agitation and carbon dioxide from the air becomes mixed therein as it is entrained with the water exposed to the air during the agitation. In this embodiment, the amount of carbon dioxide exposed to the mixture is dependent upon the length of time and velocity of mixing or agitation. Additional carbon dioxide from a carbon dioxide source (e.g., gas tank) can be flowed into the high shear mixer. A mixing apparatus suitable for entraining carbon dioxide from the air during mixing of the water and cement is described in the Related Cases referred to above (hereafter the "HEM Mixer"), now U.S. Pat. Nos. 4,944,595 and 4,946,504. These patents are incorporated herein by reference, and the HEM Mixer is discussed in detail below.

The HEM Mixer is unique from other high shear processes in that it not only mixes cement and water and disperses cement particles, but it also mixes gas therein. Each speed (rpm) of the HEM Mixer has a characteristic volume flow pattern. The addition or subtraction of cement and/or water does not change the dimension of the overall mixing envelope containing liquid, solid and gas (the "volume flow pattern") but merely increases or decreases the volume of gas being mixed with the solid and liquid components.

It has also been observed that the HEM Mixer raises the pH of the liquid phase of the mixing cement and water over the pH of conventional mixing of the cement and water at the same time interval. The principal reason for the increase in pH is that the HEM Mixer causes the liquid phase to become more saturated with calcium and hydroxyl ions. It is also believed that other high shear mixers cause this same effect.

In such cases of increased calcium and hydroxyl concentration, reactive silicas can be added to facilitate the production of a paste having an increased compressive strength. Reactive silicas are known in the art and include without limitation fly ash, silica fume, slag cement and glass. From 0.25 to 100% by weight, preferably 5-60% by weight and most preferably 10-40% by weight reactive silicas can be added to the mixing cement and water whose liquid phase has an increased concentration of calcium and hydroxyl ions.

Other mixing apparatuses capable of agitation to allow dispersion of the cement particles in water may also be utilized in connection with the present invention including a Waring blender, a Bosch electronic mixer, a food processor, a Hobart mixer, a drum mixer, GKN Colcrete mixer, a paddle mixer or hand mixing. In such cases, the amount of $CO_2$ carbon source originating from air and exposed to the cement and water mixture may not be sufficient for purposes of the present invention since such mixers have a lower surface area contact when compared to the HEM Mixer. Accordingly, as discussed below, an external carbon source such as carbon dioxide or carbon monoxide gas can be used to increase the amount of carbon source in connection with these other mixers.

It has also been observed that another aspect of the process of the present invention is contacting a gaseous carbon source with mixing cementitious material and water such that the carbon source contacts the liquid phase of the cementitious material and water mixture throughout substantially all of the mixture prior to initial set. Preferably, the carbon source is selected from the group consisting of $CO_2$, CO and mixtures thereof, although $CO_2$ is the most preferred choice. In addition, preferably a high shear mixer causes the mixing, with the HEM Mixer most preferred.

In another embodiment of the present invention, water and cement are mixed together, and carbon dioxide-containing air is bubbled through the mixture during mixing, or the carbon dioxide gas is exposed to the cement and water by allowing the carbon dioxide to flow over the mixing cement and water such that the atmosphere contiguous with the mixing cement and water is enriched in carbon dioxide. In this embodiment, any apparatus capable of mixing water and cement may be utilized, although the HEM Mixer is preferred.

In the embodiment where the contiguous atmosphere is enriched in carbon dioxide, the atmosphere should contain at least 1.0% by volume carbon dioxide and preferably from 5% to 100% and more preferably from 75-100%. In this regard, when reference is made herein to exposing the mixing water and cementitious material to a $CO_2$ carbon source, such reference is meant to include an atmosphere of $CO_2$ ranging from 5% by volume to 100% by volume, unless otherwise stated. The same is intended with respect to CO and $CO_2$/CO mixtures.

In yet another embodiment of the invention, the water is carbonated by $CO_2$, CO or mixtures thereof before the cementitious material is added. The water may be carbonated through agitation whereby carbon dioxide from the air is entrained in the water, or by carbon dioxide-containing air, carbon dioxide or carbon monoxide may be bubbled through the water.

It is believed that the introduction of a carbon source such as carbon dioxide or any weak acid including carbonic acid, sulfuric acid, hydrochloric acid, and acetic acid into the mixing water and cement prior to initial set reduces the alkalinity of the cement and water mixture, and induces the formation of an early lattice-work matrix or gel, thereby leading to an improved paste having increased stability, reduced bleeding and other improved properties. The gel is induced by the pH of the mixture dropping, for example, at least 0.05 pH and preferably at least 0.1 pH unit. Such matrix is observable in that the paste of the present invention gels or stiffens much faster than conventional paste not exposed to an elevated amount of carbon dioxide or a weak acid.

The gelling or stiffening occurs within the first few minutes of combining cement and water in the presence of the carbon source or weak acid, and after the combined mixture is allowed to remain stationary. Thus, one aspect of the present invention is stabilization of the dispersion of the cement particles in water under carbon dioxide enriched conditions.

It has been observed that if (1) the cement and water are combined until early age equilibrium is reached, and (2) the carbon source is then exposed to the mixing cement and water, and (3) the cement and water are then allowed to remain stationary, then gelation will occur. On the other hand, if the cement and water is not allowed to remain stationary after being exposed to the carbon source and thus the cement and water is not allowed to gel, but rather, early age equilibrium is allowed to recur, then if the cement and water mixture is thereafter allowed to remain stationary, gelation will not occur.

It should be appreciated that by mixing the paste with $CO_2$ for an extended period of time, the mixture becomes very stable and thick. This is considered a different state of matter than the "set".

The stiffness of the paste can be controlled by regulating the amount of Group I and II Carbon Sources exposed to the mixing cement and water. Thus more carbon dioxide tends to increase the stiffness. On the other hand, upon further mixing of the gelled paste, the workability of the paste is increased.

A concrete or mortar having an increased compressive strength may be produced as follows: A cementitious paste is formed by exposing a mixture of water and hydraulic cement to a carbon source according to one of the embodiments described above. The cementitious paste is then combined with aggregate or sand. The resulting paste-aggregate mixture is allowed to cure to thereby form a hardened concrete having an increased compressive strength.

Testing and comparative analysis according to ASTM standards has been conducted to determine the effect on the compressive strength, carbon content and viscosity of the cured cement product upon exposing a carbon source to mixing cement and water. Tables I and II summarize the results of these tests.

TABLE I OF EXAMPLES

| MIXER TYPE | Speed/Admix/Time of Mixing | Speed/Admix/Time of Mixing | Speed/Admix/Time of Mixing |
|---|---|---|---|
| STD[1,9] MIXER | —/—/—[10] | STD[9]/ O[11] /3 min | Rest/—/3 min |
| STD[1] MIXER | —/—/— | STD/ O /3 min | STD/ C /5 min |
| HEM[1] | 500[5]/5%[4]/2 min | 500/ 95%[4]/30 sec | (Mixer)[6]/ STD/ C /8 min |
| HEM[1] | 500/ O /30 sec | Mixer[6]/ STD/ O /1 min | STD/ C /13 min |
| HEM[1] | 500/ O /40 sec | Mixer[6]/ STD/C/1 min | STD/ C /8 min |
| Bosch[2] | STD/ O /2 min | Rest[8]/—/30 sec[13] | STD/ O /3 min |
| Bosch[2] | STD/ O /2 min | Rest/—/30 sec | By wt. STD/5% $NaCO_3$/3 min |
| HEM[2] | —/—/— | 500/—/30 sec | 500/ C /20 sec |
| Bosch[3] | STD/ O /2 min | Rest/—/30 sec | STD/ O /3 min |
| Bosch[3] | STD/ O /2 min | Rest/—/30 sec | STD/5% $NaCO_3$/3 min |
| HEM[3] | —/—/— | 500/—/30 sec | 500/ C /60 sec |

| MIXER TYPE | Speed/Time[14] | 3/7 DAY COMPRESSIVE STRENGTH (psi) | SHRINKAGE at 7 days (volume %) | VISC[7] (CPS) |
|---|---|---|---|---|
| STD[1,9] MIXER | STD/2 min | 4633/5546 | — | 21.3 |
| STD[1] MIXER | STD/2 min | 4881/5800 | — | — |
| HEM[1] | STD/2 min | 5291/6197 | — | 27.0 |
| HEM[1] | STD/2 min | 5563/6479 | — | 32.0 |
| HEM[1] | STD/2 min[12] | 5482/6663 | — | 21.0 |
| Bosch[2] | —/— | / | 1.56 | — |

TABLE I OF EXAMPLES-continued

| | | | | |
|---|---|---|---|---|
| Bosch[2/] | —/— | / | 0.52 | — |
| HEM[2/] | 500/20 sec | / | 0.13 | — |
| Bosch[3/] | —/— | / | 18.75 | — |
| Bosch[3/] | —/— | / | 3.13 | — |
| HEM[3/] | 500/20 sec | / | 0.39 | — |

[1/]0.51 water to cement - concrete
[2/]0.40 water to cement - paste
[3/]1.00 water to cement - paste
[4/]% of cement added in 100% air atmosphere over 30 seconds (in both tables).
[5/]500 means 500 rpm (in both tables).
[6/]Change to Standard Mixer at Standard Speed
[7/]Measured at end of mixing
[8/]Rest means the mixture was left stationary and allowed to rest.
[9/]STD means standard drum mixer in connection with mixer type column and speed in connection with speed column.
[10/]"—/—/—" entries, water was not pre-mixed.
[11/]O means air atmosphere; C means the atmosphere contiguous with the mixing cement and water was saturated with carbon dioxide.
[12/]1% by weight free lime is added to raise pH.
[13/]The "—" in the Admix column means that no admix was added.
[14/]The "—/—" entry means the mixture was allowed to rest indefinitely. In other cases, after the mixture was allowed to mix for the time and at the speed indicated, the mixture was allowed to rest indefinitely.

TABLE II OF EXAMPLES

| MIXER TYPE | Speed/Admix/ Time of mixing | Speed/Admix/ Time of mixing | Speed/Admix/ Time of Mixing |
|---|---|---|---|
| Bosch[3/] | STD/ O[7/] /2 min | Rest[8/]/—/30 sec | STD/ O /3 min |
| STIR[1/,3/] | —/—/— | STIR/ O /30 sec | STIR/ O /2 min |
| SHKE[2/,3/] | —/—/— | STIR/ O /30 sec | SHKE/ C /30 sec |
| HEM[3/] | 500/ 5%/2 min | 500/ C /2 min | 500/95%/30 sec |
| Bosch[4/] | STD/ O /2 min | Rest/—/30 sec | STD/ O /3 min |
| HEM[4/] | 500/ O /30 secs | 500/ C /30 sec | STD[10/]/ O /5 min |
| HEM[4/] | 550/ O /30 sec | 550/ C /45 sec | STD[10/]/ O /5 min |
| HOBART[4/] | —/—/— | 1 / O /5 min | STD[10/]/ O /5 min |
| HOBART[4/] | 1 / O /5 min | STD/ C /5 min | STD[10/]/ O /5 min |
| STD[5/,9/] | —/—/— | STD/ O /20 sec | STD/ O /10 min |
| STD[5/] | —/—/— | STD/ O /20 sec | STD/ C /10 min |
| HEM[5/] | 550/ O /30 sec | 550/ C /20 sec | STD[10/]/ O /5 min |
| STD[6/] | —/—/— | STD/ O /20 sec | STD/ O /10 min |
| HEM[6/] | 500/ O /30 sec | STD[10/]/ C /20 sec | STD/ O /10 min |

| MIXER TYPE | Speed/Time of Mixing | CARBON (weight %) | 3/7 DAY COMPRESSIVE STRENGTH (psi) | VISC[7/] (CPS) |
|---|---|---|---|---|
| Bosch[3/] | —/— | .072 | 5443/ | 12.6 |
| STIR[1/,3/] | —/— | .058 | 5139/ | 8.9 |
| SHKE[2/,3/] | —/— | .095 | 6134/ | 21.0 |
| HEM[3/] | 500/20 sec | .360 | 6993/ | 157.0 |
| Bosch[4/] | —/— | .071 | 5427/6377 | 21.0 |
| HEM[4/] | —/— | .091 | 6958/8417 | — |
| HEM[4/] | —/— | — | 8415/9990 | — |
| HOBART[4/] | —/— | — | 5392/6752 | — |
| HOBART[4/] | —/— | — | 6072/7502 | — |
| STD[5/,9/] | —/— | — | 2626/3708 | — |
| STD[5/] | —/— | — | 3645/4813 | — |
| HEM[5/] | —/— | — | 3637/4927 | — |
| STD[6/] | —/— | — | 3308/ | — |
| HEM[6/] | —/— | — | 3820/ | — |

[1/]STIR means hand stirring in a 6" × 12" cylinder with a rod.
[2/]SHKE means hand shaking in a 6" × 12" cylinder with a lid.
[3/]0.40 water to cement - paste
[4/]0.40 water to cement - paste
[5/]0.63 water to cement - mortar
[6/]0.55 water to cement - mortar
[7/]See footnote [11/]
[8/]Mixture let rest stationary
[9/]STD means drum mixer in connection with mixer type column and standard speed in connection with speed column
[10/]change to standard drum mixer at standard speed
[11/]O means air atmosphere; C means the atmosphere contiguous with the mixing cement and water was saturated with carbon dioxide. Atmosphere for purposes of these tables is synonymous with admix.

It has also been determined that the paste cure may also be regulated by use of Group II Carbon Sources or preferably carbon dioxide exposure. Specifically, as the volume of carbon dioxide mixed with water and cementitious material prior to hydration increases, the rate of cure and hydration can be accelerated. Thus the rate of cure of a predetermined paste may be regulated by exposing a predetermined volume of carbon dioxide to a mixture of water and cement of a predetermined ratio to form a paste. Any of the methods for mixing the water, cementitious material and carbon sources described above may be utilized. The paste is then allowed to cure by hydration. The rate of setting of concrete may also be regulated by mixing aggregate with cementitious paste produced according to this method.

The above disclosure generally describes the present invention. A more complete understanding may be obtained by reference to the following specific examples.

EXAMPLE 1

50 pounds of Portland cement and 20 pounds of water (0.40 ratio) were mixed by a conventional mortar-type 1.2 c.f. capacity drum mixer with the shaft revolving at 25 rpm. The paste was mixed for 15 minutes, allowed to cure, and the compressive strength according to ASTM standards was measured as 6143 p.s.i. at 7 days. As a comparison, and according to the present invention, carbon dioxide was allowed to flow for 15 minutes over the mixing cement and water by holding a tube of flowing carbon dioxide inside the drum mixer and over the mixing paste, so that the atmosphere contiguous with the mixing cement and water was greater than 5% by volume $CO_2$. The paste was allowed to cure, and the compressive strength according to ASTM standards was measured as 7480 p.s.i. at 7 days.

EXAMPLE 2

The same as Example 1 except the HEM Mixer of Embodiment 2 below was used at a shaft rpm of 500. The ASTM compressive strength was 8422 p.s.i. at 7 days.

In addition to enriching the mixing paste with a carbon source prior to initial set, the resulting paste can be subjected to a localized stress which also is believed to increase the quality of the cured paste. By the term "localized stress," it is meant subjecting the paste to a localized force sufficient to deform or disrupt the paste in a local region of the paste. Methods of inducing such localized stresses include without limitation subjecting the paste to additional mixing with a spoon, or cutting the paste with a sharp object such as a blade including metal blades, passing the paste through a screen, adding aggregate to the paste, or extruding the paste. By so doing, further improvements in strength and/or toughness have been achieved.

EXAMPLE 3

The paste of Example 2 was subjected to localized stressing by multiple sharp blade cutting through the paste, then cast and cured according to ASTM procedures. The compressive strength was 9190 p.s.i. at 7 days.

One way of characterizing the cured paste of the present invention is to determine the carbon content of the paste at an age less than 1 hour after mixing the cement and water. Freshly manufactured hydraulic cement typically has a carbon content of less than 0.01% by weight, usually in the form of trace organic carbon. The paste of the present invention at the 1 hour age has an increased carbon content over that present in the total volume of unprocessed cement and water to be processed of at least 1%, preferably at least 10% and optimally greater than 100%.

It should be appreciated that an important aspect of the present invention is that the carbon source exposure occur before the initial set. Typically for a 0.30-0.50 water to cement ratio and carbon dioxide as the carbon source, the exposure should occur within ten (10) minutes after mixing begins. Preferably the mixing and carbon source exposure occurs as fast as possible, optimally within less than 2 minutes after mixing begins.

In one aspect of the present invention, it is desirable that the mixed paste rest or sit after mixing, preferably for about 30 seconds to 1 hour. Preferably the resulting paste is then subjected to localized stress before rapid curing begins.

In another aspect of the present invention a carbonate salt such as $NaCO_3$, $KCO_3$, $CaCO_3$ or other carbonate salts can be used to increase the short and long term strength of paste and concrete. To do so, and like the other Group I Carbon Sources, one combines and mixes a hydraulic cement and water for a sufficient amount of time for the calcium, silica and alumina of cement to go into the early age equilibrium. After the early age equilibrium is reached, the salt can be added in an amount ranging from 0.001% to 25% by weight of cement, preferably from 0.25 to 0.5%. Then the material is continued to mix at least until the early age equilibrium is reached again. If the material is not continued to mix, but rather is let remain stationary, the mixture will gel. After allowing the paste to gel, localized stressing can then be applied to provide an increase in toughness.

Upon addition with mixing followed by stationary rest, the added Group I and Group II Carbon Sources cause the pH of the mixture to decrease (typically about 0.1 pH or more) thereby causing gelation. Thus by decreasing the pH, together with letting the mixture rest stationary, gelation occurs, thereby improving certain paste properties. For example, gelation provides a paste having decreased bleeding and upon cure, a cured paste or concrete with reduced shrinkage. pH can also be decreased to induce gelation, for example, by adding sulfuric acid, acetic acid, carbonic acid, hydrochloric acid, other weak acids, carbonate salts, $CO_2$ and CO or mixtures thereof.

THE HEM MIXER

The HEM Mixer employs a hollow generally cylindrical housing. Disposed in the radial center of the housing is a rotatable shaft, having its upper end coupled to a shaft rotating mechanism.

The HEM Mixer housing includes a downthrust generating component and an upthrust generating component. These components act in cooperation with a directional control means to form turbulent liquid (cement and water) mass flow patterns which move in several opposing directions relative to each other within the hollow housing.

A preferred embodiment of the inner walls of the housing of the HEM Mixer includes an upper cylindrical portion adjacent to a middle conical portion which is adjacent to a lower conical portion.

The downthrust generating component within the housing includes a single upper and a lower set of downthrust blades. The upthrust generating component includes an upper and a lower set of upthrust blades.

The single upper set of substantially horizontal downthrust blades, which rotate within the cylindrical portion of the housing, are disposed in spaced relation relative to each other and are affixed to the drive shaft. The lower set of downthrust blades, which rotate within the middle conical portion of the housing, includes inclined blades disposed in spaced relation relative to each other. The lower set of downthrust blades have a trailing edge and a leading edge.

The upper upthrust blades, which rotate within the cylindrical portion of the housing, are substantially horizontal and are disposed in spaced relation relative to each other and are coupled to the outer ends of the upper set of downthrust blades.

The lower set of upper upthrust blades includes substantially vertical blades disposed in spaced relation relative to each other and affixed to the lower portion of the drive shaft. Each of these lower upthrust blades has a leading edge and a trailing edge.

The housing also includes several paired upper and lower vertically disposed baffles extending inwardly from the inner wall of the housing.

The lower end of the upper baffle of a baffle pair and the upper end of the lower baffle are spaced from each other, and the upper upthrust blade is rotatable within the baffle space.

FIGS. 1-8 show one embodiment of the HEM Mixer. The HEM Mixer generally indicated as 10 includes a generally cylindrical hollow housing or enclosure generally indicated as 12 having a feed inlet generally indicated as 14a formed in the upper portion of the housing to supply dry hydraulic cement to the interior of the hollow housing 12, a feed inlet 14b for supplying water, a discharge outlet generally indicated as 16 formed in the lower portion of the housing to discharge the resulting paste and a longitudinally disposed rotatable shaft 28.

Figure 1:
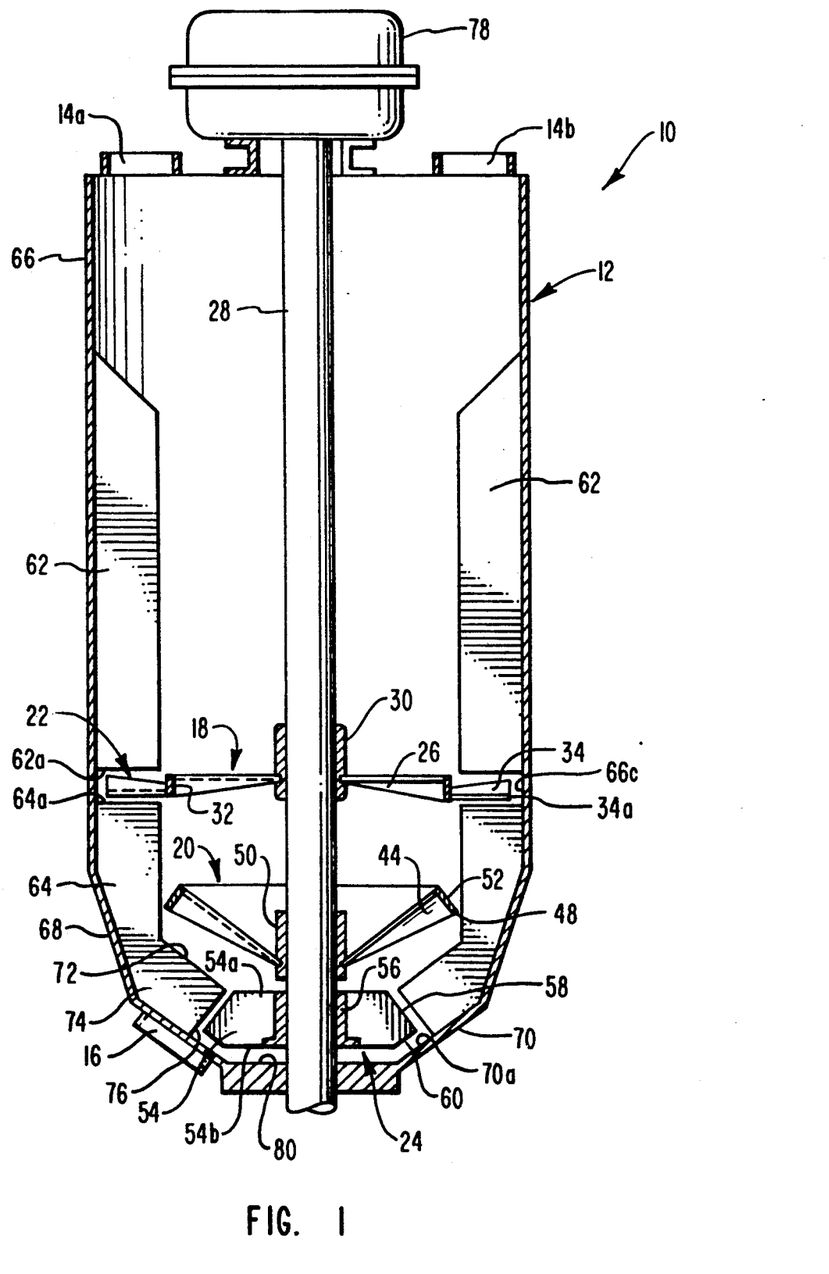
FIG. 1 is a cross-sectional schematical side view of one embodiment of the HEM Mixer.

As shown in FIG. 1, the inner surface of the housing 12 includes a substantially cylindrical upper portion 66, a conical middle portion 68 and a conical lower portion 70.

The housing 12 is configured to operatively house a thrust generating assembly and a directional control assembly to cooperatively form liquid mass flow patterns moving in various directions relative to each other within the hollow housing 12.

The thrust generating assembly includes a downthrust generating component and an upthrust generating component.

As shown in FIG. 1, the downthrust generating component includes a single upper set and a lower set of blades generally indicated as 18 and 20, respectively. The upthrust generating component includes an upper and a lower set of blades generally indicated as 22 and 24, respectively.

Figure 3:
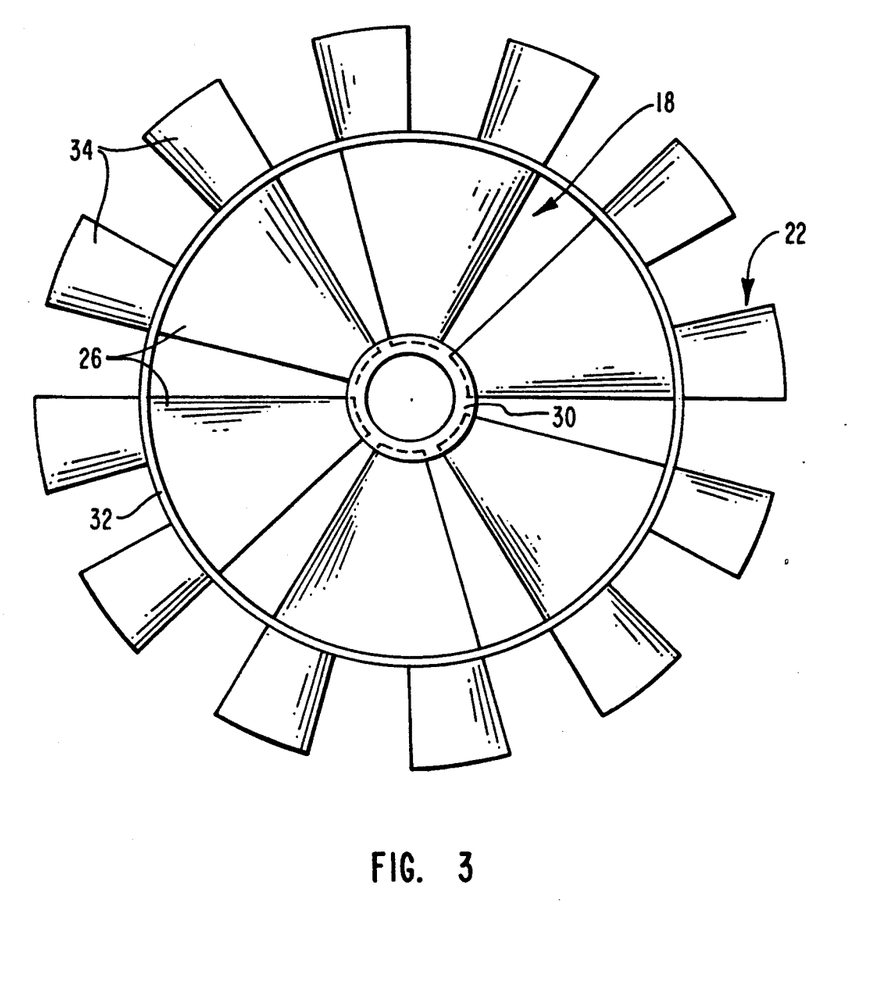
FIG. 3 is a top view of the upper set of downthrust blades of one embodiment of the HEM Mixer.

As best shown in FIGS. 1 and 3, the single upper set of downthrust blades 18 includes at least two and preferably six substantially horizontal blades 26 coupled to drive shaft 28 in spaced relation relative to each other by an upper collar 30. The outer end of each of the substantially horizontal upper downthrust blades 26 is interconnected by an upper annular support ring 32.

Figure 5:
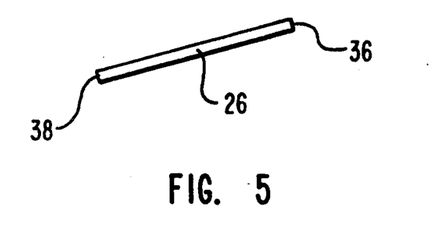
FIG. 5 is a partial cross-sectional end view of an upper upthrust blade of one embodiment of the HEM Mixer.

As best shown in FIGS. 1, 3 and 5, the upper set of upthrust blades 22 includes at least six and preferably twelve substantially horizontal blades each indicated as 34 affixed in spaced relation relative to each other on the upper annular support ring 32. As shown in FIG. 5, each of the plurality of substantially horizontal upper upthrust blades 34 includes a leading and trailing edge indicated as 40 and 42, respectively. The smallest distance between the leading edge 40 of the upper upthrust blade and the lower edge 62a of the upper baffle 62 is "G1". The smallest distance between the trailing edge 42 of the upper upthrust blade and the upper edge 64a of the lower baffle 64 is "G2", and "G4" is the smallest distance between the outermost end of the upper upthrust blade 34a and the cylindrical inner wall portion of the housing 66a.

Figure 4:
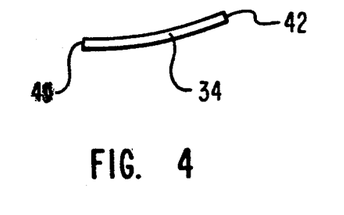
FIG. 4 is a partial cross-sectional end view of an upper downthrust blade of one embodiment of the HEM Mixer.

As shown in FIGS. 1, 3 and 4, each of the plurality of substantially horizontal upper downthrust blades 26 is substantially pie-shaped in configuration, with each having a leading edge and trailing edge indicated as 36 and 38, respectively.

Figure 6:
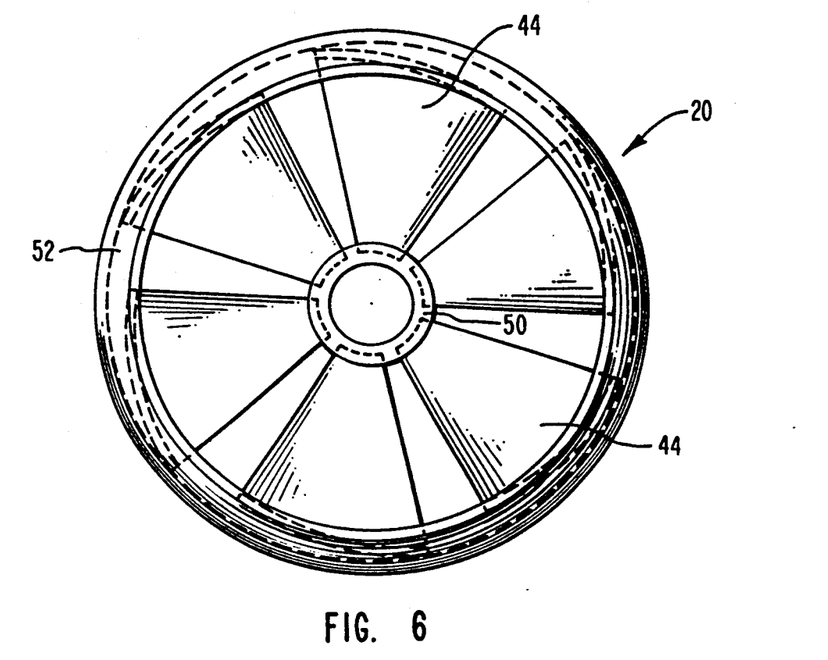
FIG. 6 is a top view of the lower downthrust blades of one embodiment of the HEM Mixer.

As shown in FIGS. 1, 3 and 6, the lower set of downthrust blades 20 includes at least two and preferably six inclined blades each indicated as 44, with each including a leading edge 46 and a trailing edge 48 and having a configuration similar to that of the substantially horizontal upper downthrust blades 26. The lower portion of each inclined intermediate downthrust blade 44 is attached to the drive shaft 28 by an intermediate collar 50, and the upper portions are affixed to an intermediate support ring 52 such that the intermediate downthrust blades 44 form a substantially conical configuration relative to the drive shaft 28. As described below, the conical plane of the intermediate downthrust blades 44 is substantially parallel to lower portion 70 of the housing 12.

To direct the vertical movement of the mixing paste, upper and lower directional control means is provided. As shown in FIG. 1, the upper directional control means preferably includes a plurality, preferably 2-12, and more preferably 8, vertically disposed flat baffles each indicated as 62 extending radially inwardly from the housing 12. The lower directional control means includes a plurality, preferably 2-12, and more preferably 8 vertically disposed flat baffles each indicated as 64 extending radially inwardly from the housing 12.

Figure 2:
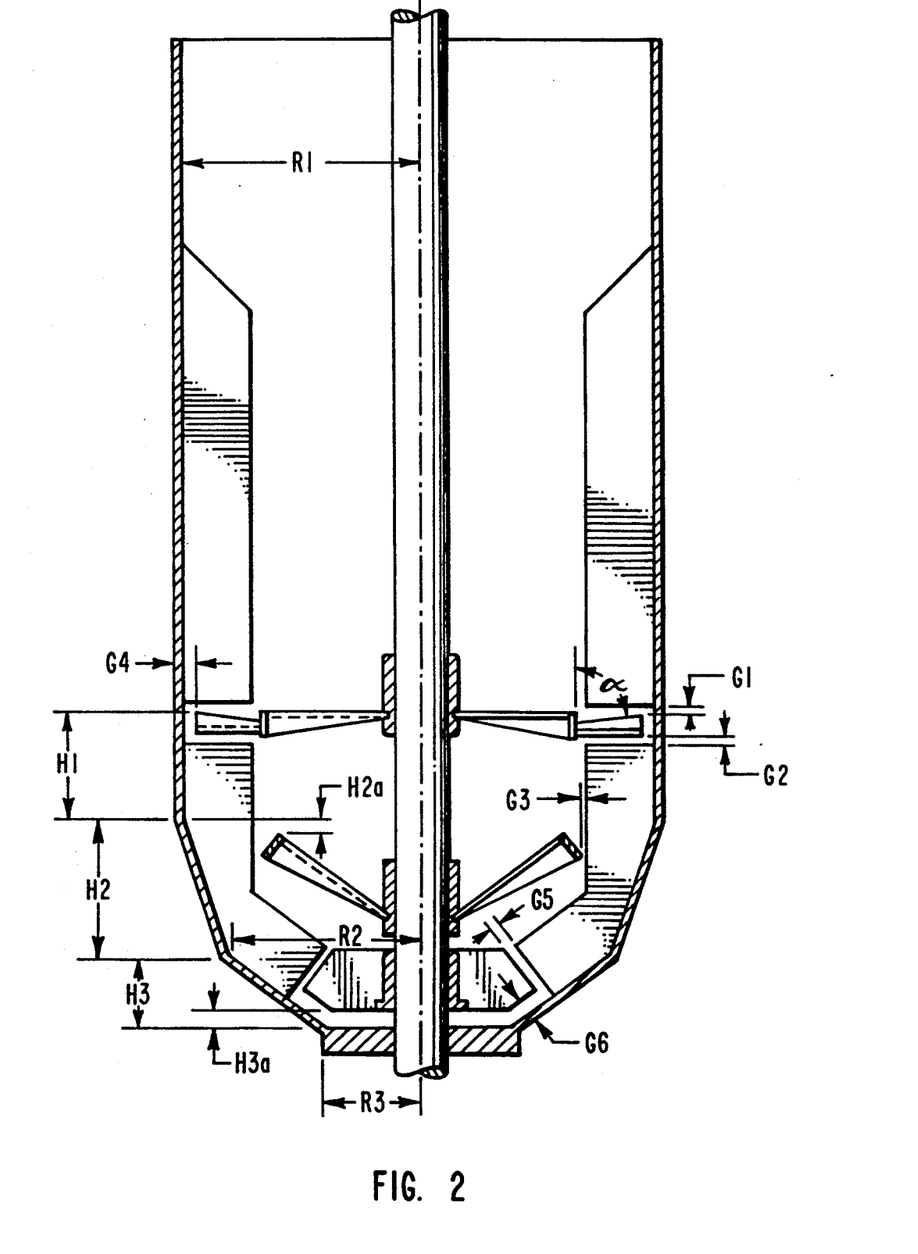
FIG. 2 is a cross-sectional schematical view of one embodiment of the HEM Mixer showing certain dimensions.

With further reference to FIG. 2, "G5" is the smallest distance between the trailing edge 58 of the lower upthrust blade and the lower free edge 76 of the opposing lower baffle. "G3" is the smallest horizontal distance between the trailing edge 48 of the lower downthrust blade and the outer edge of the opposing lower baffle 64. "G6" is the smallest distance between the leading edge 60 of the lower upthrust blade and the lower conical inner wall portion of the housing 70a.

Figure 7:
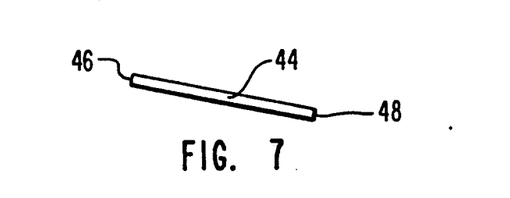
FIG. 7 is a partial cross-sectional end view of a lower downthrust blade of one embodiment of the HEM Mixer.
Figure 8:
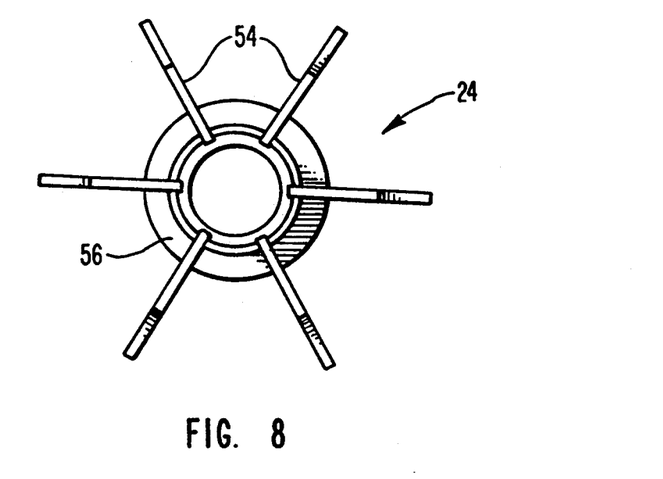
FIG. 8 is a cross-sectional top view of the lower downthrust blades of one embodiment of the HEM Mixer.

As shown in FIGS. 1 and 7, the lower set of upthrust blades 24 includes at least two and preferably six flat substantially vertical blades each indicated as 54 coupled to the drive shaft 28 by lower collar 56. As shown in FIG. 1, the outer portion of each flat substantially vertical lower upthrust blade 54 includes an upper and lower edge indicated as 58 and 60, respectively, inclined relative to each other. The lower edge is preferably parallel to the lower conical wall portion 70 of the housing.

It should also be appreciated that the lower set of upthrust blades includes the upper and lower inclined edges 58 and 60. This configuration in the present invention further adds to the increased turbulence and multiplicity of the mechanical and liquid shear zones which further impact upon the ability of the HEM Mixer.

As shown in FIG. 1, the lower inclined portion 70, the inner edges 72 of the lower portion 74 of the lower baffles 64, the conical plane formed by the lower downthrust blades 44 and the lower edges 60 of the flat substantially parallel relative to each other. Similarly, the lower edges 76 of the lower portion 74 of the lower baffles 64 are substantially parallel to the upper edges 58 of the flat substantially vertical lower upthrust blades 54.

Also with reference to FIG. 2, three radii R1, R2 and R3, three heights H1, H2 and H3, and two vertical distances H2a and H3a can be defined.

R1 is the radius of the cylindrical portion of the inner wall of the housing, R2 is the smallest radius of the middle conical portion of the inner wall of the housing within the plane containing the upper edge 54a of the lower upthrust blade, and R3 is the smallest radius of the lower conical portion of the inner wall of the housing along the plane containing the lower edge 54b of the lower upthrust blade.

H1 is the vertical distance, along the shaft, between the horizontal plane containing the leading edge of the upper upthrust blade and lower end of the cylindrical portion 66 of the housing, H2 is the distance, along the shaft 28, between the horizontal plane containing the lower end of the cylindrical portion 66 of the housing and the horizontal plane containing the lower end of the middle conical portion 68 of the housing, and H3 is the distance, along the shaft 28, between the horizontal plane containing the lower end of the middle portion of the housing 68 and the horizontal plane containing the lower end of the lower conical portion 70 of the housing.

It should be appreciated that the middle and lower conical portions can be modified and changed to a single spherical portion having the same volume. In such case H2 is defined as the smallest distance between the lowest point on the housing shaft where the inner radius is R1 and the highest point on the shaft where the inner radius is R2; and H3 is the smallest distance between the lowest point on the housing shaft where the inner radius is R2 and the highest point on the shaft where the inner radius is R3.

In general the upper downthrust/upper upthrust blade assembly must be higher than the middle downthrust blades which in turn must be higher than the lower upthrust blades. With reference to FIGS. 1 and 2, H2a is the smallest vertical distance between the height (along the shaft) containing the horizontal plane of the upper most portion of the lower downthrust blade and the horizontal plane containing the largest radius of the middle conical portion 68 of the housing. H3a is the smallest vertical distance between the bottom 80 of the mixer and the lowest portion of the lower upthrust blade.

In order to obtain the best results from the HEM Mixer, it is necessary that the radii, height and vertical distance dimensions be chosen to be within certain ratios. For R1 ranging from 4.0 to 48.0 inches, the ratio of R1 to H1 ranges from 0.39 to 0.45, the ratio of R1 to R2 ranges from 0.80 to 0.83, the ratio of R1 to H2 ranges from 0.59 to 0.61, the ratio of R1 to R3 ranges from 0.36 to 0.41, the ratio of R1 to H3 ranges from 0.30 to 0.32, the ratio of R1 to H2a ranges from 0.002 to 1.0, and the ratio of R1 to H3a ranges from 0.001 to 1.0.

The gap distances G1-G6 shown in FIG. 12 constitute six mechanically induced shear zones.

For R1 ranging from 4.0 to 48.0 inches, G1-G6 should range from 0.1 to 2.0 inches. The preferred ranges for G1-G6 are G1=0.20±0.125, G2=0.20±0.125, G3=0.20±0.125, G4=0.38±0.125, G5=0.25±0.125 and G6=0.50±0.125.

With reference to FIG. 2, it should be appreciated that the angle between the outer face of the support ring 32 and the trailing edge of the upper upthrust blade ranges from 45°-90°, and is preferably 80°.

For R1=8.0 inches, shaft rpm can range from 300-900, and preferably 500. For R1=24 inches, shaft rpm can range from 150-250, and preferably 165. In these preferred cases, G1-G3 are 0.20, G4 is 0.38, G5 is 0.25 and G6 is 0.50.

In addition to the dimensions discussed above, the relationship between shaft rpm and R1 should be such that the product of R1 multiplied by shaft rpm ranges from 2,000 to 7,000, with the preferred range being from 4,000 to 5,000.

The stationary paste volume should range from a height of 0.5H1+H2+H3 as a minimum to a height of H1+H2+H3+(4×R1) as a maximum. The preferred range is between a resting volume height on the shaft of H1+H2+H3+0.5R1 to as resting volume height on the shaft of H1+H2+H3+2.5R1.

Mix time ("MT") is proportional to volume, water to cement ratio and rpm. The relationship is such that the higher the water to cement ratio the less critical the mix time, and the higher the volume the longer the mix time. In general, the paste produced by the generator of the present invention can be produced using the generator of the present invention and the rpm and volume ranges of the present invention, in a preferred mix time being 60 to 120 seconds.

Water to Portland cement ("W/C") ratio ranges from 0.20 to 2.00 with a preferred range of 0.30 to 0.50. This range is using typically available hydraulic cement and typically available water, but without the affect of admixtures or other chemicals. The addition of such and other chemicals may alter the total range and/or preferred range of water to cement ratios.

Lastly it should be appreciated that the shaft is rotated by mechanism means for rotation 78 which is apparent to those of skill in the art.

EMBODIMENT 1

A cement paste generator was constructed wherein, in inches, R1=24.75, H1=9.75, R2=19.81, H2=14.50, R3=9.00, H3=7.50, H2a=0.11, H3a=0.02, G1-G3=0.20, G4=0.38, G5=0.25, and G6=0.50.

EMBODIMENT 2

A cement paste generator was constructed wherein, in inches, R1=8.00, H1=3.60, R2=6.50, H2=4.90, R3=3.25, H3=2.37, H2a=0.06, H3a=0.07, G1-G3=0.20, G4=0.38, G5=0.25 and G6=0.50.

EMBODIMENT 3

A cement paste generator was constructed wherein, in inches, R1=24.00, H1=11.75, R2=19.81, H3a=0.01, G1-G3=0.20, G$=0.38, G5=0.25, and G6=0.50.

The present invention is not to be limited in scope by the examples which are intended as illustrations of one aspect of the invention. Indeed, various modifications of the invention in addition to those shown and described herein will become apparent to those skilled in the art from the foregoing description. Such modifications are intended to fall within the scope of the appended claims.

We claim:

1. A process for producing a nonfoamed concrete building material, the process including the following steps:
   (a) mixing a quantity of hydraulic cement and water to form a mixture of hydraulic cement and water, said mixing step continuing until a first occurrence of early age equilibrium is reached;
   (b) controlling the exposure of a carbon source to the mixture of hydraulic cement and water such that a quantity of carbon from the carbon source is incorporated into and chemically reacts with the mixture of hydraulic cement and water in order to modify the workability of the mixture of hydraulic cement and water; and
   (c) allowing the mixture of hydraulic cement and water from step (b) to reach a second occurrence of early age equilibrium, wherein said steps (a), (b), and (c) occur during mixing, prior to initial set, such that the resulting cured nonfoamed concrete has sufficient strength for use as a building material.

2. The process of claim 1 wherein the carbon source is selected from the group consisting of $CO_2$, CO, carbonate salts, $CO_2$ enriched air, and mixtures thereof.

3. The process of claim 2 wherein the carbon source is selected from the group consisting of $CO_2$, CO and mixtures thereof.

4. The process of claim 3 wherein the carbon source is $CO_2$.

5. The process of claim 1 wherein the carbon source is exposed to the paste in the absence of foam-stabilizing agent.

6. The process of claim 1 wherein at a time at least 1 hour after exposing the carbon source to the mixture of hydraulic cement and water, the amount of carbon incorporated into the building material which chemically reacted with the hydraulic cement and water is increased by the process at least 1% over that present in the cement and water prior to processing.

7. The process of claim 1 wherein the ratio of cement to water in the mixture of hydraulic cement and water ranges from about 0.1 to about 20.

8. The process of claim 7 wherein the ratio of cement to water in the mixture of hydraulic cement and water ranges from about 0.2 to about 2.0.

9. A process for producing a nonfoamed building material, the process including the following steps:
   (a) mixing a quantity of hydraulic cement and water to form a mixture of hydraulic cement and water, said mixing step continuing until early age equilibrium is reached;
   (b) controlling the exposure of a carbon source to the mixture of hydraulic cement and water such that a quantity of carbon from the carbon source chemically reacts with the mixture of hydraulic cement and water in order to modify the workability of the mixture of hydraulic cement and water, said exposing step occurring during mixing, prior to initial set; and
   (c) allowing the mixture of hydraulic cement and water from step (b) to form a gelled mixture of nonfoamed concrete, such that the resulting cured nonfoamed concrete has sufficient strength for use as a building material.

10. The process according to claim 9 further including the step of subjecting the gelled mixture to a localized stress.

11. The process of claim 9, wherein formation of the gelled mixture is induced by decreasing the pH of the mixture of hydraulic cement and water by at least 0.05 pH units.

12. The process according to claim 9 wherein the formation of the gelled mixture is induced by adding a weak acid to the mixture of hydraulic cement and water prior to initial set.

13. The process according to claim 12 wherein the weak acid is selected from the group consisting of carbonic acid, sulfuric acid, acetic acid, hydrochloric acid, and mixtures thereof.

14. The process according to claim 10, wherein the localized stress consists of extruding the gelled mixture.

15. The process according to claim 10, wherein the localized stress consists of cutting the gelled mixture with a sharp object.

16. The process according to claim 15, wherein the sharp object is a blade.

17. The process according to claim 10, wherein the localized stress is created by passing the gelled mixture through a screen.

18. The process according to claim 10, wherein the localized stress consists of adding aggregate to the gelled mixture.

19. A process for producing a nonfoamed building material, the process including the following steps:
   (a) combining hydraulic cement and water together to form a mixture;
   (b) controlling the exposure of the mixture to a carbon dioxide source after a period of time such that a quantity of carbon from the carbon dioxide source is incorporated into and chemically reacts with the mixture in order to modify the workability of the mixture; and
   (c) allowing the mixture to cure to a concrete building material without a significant volume of void defects sufficient to significantly reduce the strength of the cured concrete building material.

20. The process of claim 19 wherein the cement and water are mixed by a high shear energy mixing process.

21. A process for producing a nonfoamed building material, the process including the following steps:
   mixing hydraulic cement and water in a distinct high shear energy volume flow pattern such that addition or removal of cement or water does not change the volume flow pattern, said mixing being performed in an atmosphere contiguous with the mixing cement and water which is enriched in carbon dioxide such that a quantity of carbon from the carbon dioxide is incorporated into and chemically reacts with the mixing of hydraulic cement and water in order to modify the workability of the flow volume.

22. The process according to claim 21, wherein the atmosphere contiguous with the mixing cement and water contains at least 1% by volume carbon dioxide.

23. The process according to claim 22, wherein the atmosphere contiguous with the mixing cement and water contains from 5% to 100% carbon dioxide.

24. A process for producing a nonfoamed cement paste, comprising the steps of:
   (a) generating water enriched with $CO_2$:
   (b) combining hydraulic cement with said water such that a quantity of carbon from the water enriched with $CO_2$ is incorporated into and chemically reacts with the combined hydraulic cement and water to form a cement paste in which the workability of the cement paste can be controlled; and
   (c) allowing the cement paste to cure to form a cementitious matrix without significant void defects in the cementitious matrix.

25. The process of claim 24, wherein carbonated water is generated by agitating the water to entrain carbon dioxide from air.

26. The process of claim 24, wherein carbonated water is generated by bubbling carbon dioxide-containing air through the water.

27. The process of claim 24, wherein the hydraulic cement is Portland cement.

28. The paste produced using the process of claim 24.

29. A process for increasing the compressive strength of a nonfoamed concrete product, the process comprising the step of:

(a) mixing water and hydraulic cement to produce a paste;

(b) controlling exposure of said mixing water and hydraulic cement to an atmosphere contiguous with the mixing hydraulic cement and water, said atmosphere being enriched with carbon dioxide, such that a quantity of carbon from said atmosphere is incorporated into and chemically reacts with the mixture of hydraulic cement and water in order to modify the workability of the mixing hydraulic cement and water such that the mixture of the hydraulic cement and water can be readily worked into a shape; and (c) allowing the mixture to cure into a concrete product of a shape such that the concrete product has increased strength.

30. The process of claim 29, wherein the paste is allowed to gel and a localized stress is applied to the paste prior to initial set of the paste.

31. The process of claim 30, wherein the localized stress is induced by adding aggregate to the paste.

32. A process for producing a nonfoamed concrete building material including the steps of:

(a) mixing a quantity of hydraulic cement and water for a period of time, thereby forming a mixture of hydraulic cement and water;

(b) controlling the exposure of the mixing hydraulic cement and water to an atmosphere enriched with a gaseous carbon source selected from the group consisting of $CO_2$, $CO$ and mixtures thereof such that a quantity of carbon from the carbon source is incorporated into the mixture of hydraulic cement and water during mixing, and prior to initial set in order to modify the workability of the mixing hydraulic cement and water, such that the resultant concrete building material has a matrix containing a minimal volume of voids.

33. The process according to claim 32 wherein the carbon source is CO.

34. The process according to claim 32 wherein the carbon source is an enriched $CO_2$ atmosphere.

35. The process according to claim 32 wherein the quantity of carbon incorporated into the mixture of hydraulic cement and water is increased at least 1% above that present in the hydraulic cement, water and unenriched atmosphere prior to processing.

36. The process according to claim 32 wherein the mixture of hydraulic cement and water is exposed to the carbon source for at least 30 seconds before mixing ends.

37. A nonfoamed cementitious material manufactured according to the process of:

(a) first, combining hydraulic cement and water;

(b) and second, increasing the carbon content of the combined hydraulic cement and water by greater than 1% at an age at least 1 hour after initially combining the hydraulic cement and water in order to modify the workability of the combining hydraulic cement and water, said greater than 1% increase in carbon content arising from carbon incorporated into the cementitious material originating from at least one carbon source selected from the group consisting of $CO_2$, $CO_2$ enriched air, CO and mixtures thereof.

38. The cementitious material produced according to the process of claim 37.

39. The process according to claim 1, wherein the building material is nonfoamed concrete.

40. The process according to claim 39, wherein aggregate is added to the mixture of hydraulic cement and water after the second occurrence of early age equilibrium.

41. A process for producing a nonfoamed concrete building material, the process comprising the steps of:

(a) mixing a quantity of hydraulic cement and water so as to form a mixture; and (b) controlling the exposure of the mixture to a carbon source, said exposure occurring during mixing, prior to initial set, in order to modify the workability of the mixture, wherein at a time greater than one hour after mixing of the hydraulic cement and water the mixture has an increased carbon content of at least 1% over the carbon present in the hydraulic cement and water which were mixed, such that the resultant nonfoamed concrete control has sufficient strength for use as a building material.

42. The process according to claim 42, wherein the carbon content increase is at least 10%.

43. The process according to claim 41, wherein the ratio of the quantity of water to hydraulic cement is in the range from about 0.2 to about 0.5, and wherein the carbon source exposure occurs within ten minutes after mixing begins.

44. The process according to claim 43, wherein the carbon source exposure occurs less than two minutes after mixing begins.

45. The process according to claim 41, wherein the mixture is allowed to rest after carbon source exposure for a period of time in the range from about 30 seconds to about an hour.

46. The product produced according to the process of claim 1.

47. The product produced according to the process of claim 2.

48. The product produced according to the process of claim 3.

49. The product produced according to the process of claim 4.

50. The product produced according to the process of claim 6.

51. The product produced according to the process of claim 9.

52. The product produced according to the process of claim 13.

53. The product produced according to the process of claim 18.

54. The product produced according to the process of claim 19.

55. The product produced according to the process of claim 20.

56. The product produced according to the process of claim 21.

57. The product produced according to the process of claim 22.

58. The product produced according to the process of claim 23.

59. The product produced according to the process of claim 29.

60. The product produced according to the process of claim 30.

61. The product produced according to the process of claim 32.

62. The product produced according to the process of claim 34.

63. The product produced according to the process of claim 35.

64. The product produced according to the process of claim 40.

65. A process for regulating the rate of hydration of a nonfoamed hydraulic cement paste formed by first, mixing water and hydraulic cement and second, controlling the exposure of the mixing water and hydraulic cement to a carbon source selected from the group consisting of $CO_2$, CO, air enriched by a carbon source, and mixtures thereof prior to initial set such that a quantity of carbon from the carbon source is incorporated into and chemically reacts with the mixing water and hydraulic cement in order to modify the workability of the paste and regulate the rate of hydration of the hydraulic cement paste.

66. A process for reducing the shrinkage of cured nonfoamed hydraulic cement paste formed by first, mixing water and hydraulic cement and second, controlling the exposure of the mixing water and hydraulic cement to a carbon source selected from the group consisting of $CO_2$, CO and mixtures thereof prior to initial set such that a quantity of carbon from the carbon source is incorporated into and chemically reacts with the mixing water and hydraulic cement in order to modify the workability of the mixing water and hydraulic cement so as to reduce the shrinkage of the cured hydraulic cement paste.

67. A process for reducing the bleeding of nonfoamed hydraulic cement paste formed by first, mixing water and hydraulic cement and second, controlling the exposure of the mixing water and hydraulic cement to a carbon source selected from the group consisting of $CO_2$, CO and mixtures thereof prior to initial set such that a quantity of carbon from the carbon source is incorporated into and chemically reacts with the mixing water and hydraulic cement in order to modify the workability of the mixing water and hydraulic cement and to reduce the bleeding of the hydraulic cement paste during a curing process.

68. A process for producing a nonfoamed concrete building material, the process including the following steps:
(a) mixing hydraulic cement and water together by a high shear energy mixing process; and
(b) controlling the exposure of the mixing hydraulic cement and water to a carbon source selected from the group consisting of carbon dioxide, carbon monoxide, carbonate salts, and mixtures thereof such that a quantity of carbon from the carbon source is incorporated into and chemically reacts with the mixing hydraulic cement and water in order to modify the workability of the hydraulic cement and water and to increase the strength of the resulting nonfoamed concrete building material.

69. The process of claim 68 wherein the carbon source is carbon dioxide.

70. The process of claim 68 wherein the carbon source is an atmosphere contiguous with the mixing cement and water enriched in carbon dioxide.

71. A process for producing a nonfoamed concrete building material, the process including the following steps:
(a) mixing a quantity of hydraulic cement and water together to form a mixture of hydraulic cement and water;
(b) controlling the exposure of a carbon source to the mixing hydraulic cement and water such that a quantity of carbon from the carbon source is incorporated into and chemically reacts with the mixture of hydraulic cement and water in order to modify the workability of the mixture of hydraulic cement and water, the carbon source selected from the group consisting of carbon dioxide, carbon monoxide and mixtures thereof; and
(c) allowing the mixture of hydraulic cement and water from step (b) to reach early age equilibrium, wherein said steps occur prior to initial set.

72. The process of claim 71 wherein the carbon source includes carbon dioxide.

73. The process of claim 71 wherein the carbon source is exposed to the water and cement by flowing the carbon source over the cement and water mixture.

74. The process of claim 71 wherein the quantity of carbon incorporated into the nonfoamed concrete building material which chemically reacted with the hydraulic cement and water is increased by at lest 1% over that present in the cement and water prior to mixing.

75. The process of claim 71 wherein the ratio of hydraulic cement to water in the mixture ranges from about 0.1 to about 20.

76. A process for producing a nonfoamed concrete building material, the process including the following steps:
(a) mixing a quantity of hydraulic cement and water together to form a mixture of hydraulic cement and water;
(b) controlling the exposure of a carbon source to the mixing cement and water such that a quantity of carbon from the carbon source is incorporated into and chemically reacts with the mixing cement and water in order to modify the workability of the mixing cement and water, the carbon source selected from the group consisting of $CO_2$, CO, air enriched by a carbon source, and mixtures thereof; and
(c) allowing the mixture from step (b) to form a gelled mixture.

77. The process of claim 76 further including the step of subjecting the gelled mixture to a localized stress.

78. The process of claim 76, wherein formation of the gelled mixture is induced by decreasing the pH of the mixture of hydraulic cement and water by at lest 0.05 pH units.

79. The process according to claim 76 wherein the formation of the gelled mixture is induced by adding a weak acid to the mixture of hydraulic cement and water prior to initial set.

80. The process according to claim 79 wherein the weak acid is selected from the group consisting of carbonic acid, sulfuric acid, acetic acid, hydrochloric acid, and mixtures thereof.

81. The process according to claim 77, wherein the localized stress consists of extruding the gelled mixture.

82. The process according to claim 77, wherein the localized stress consists of cutting the gelled mixtures with a sharp object.

83. The process according to claim 82, wherein the sharp object is a blade.

84. The process according to claim 77, wherein the localized stress is created by passing the gelled mixture through a screen.

85. The process according to claim 77, wherein the localized stress consists of adding aggregate to the gelled mixture.

86. The process of claim 76, wherein the mixing step is performed in an atmosphere contiguous with the mixing hydraulic cement and water, and wherein the atmosphere contains at least 1% by volume carbon dioxide.

87. The process according to claim 86, wherein the mixing step is performed in an atmosphere contiguous to the mixing hydraulic cement and water, and wherein the atmosphere contains from about 5%–100% by volume carbon dioxide.

88. The nonfoamed concrete building material produced according to the process of claim 68.

89. The nonfoamed concrete building material produced according to the process of claim 69.

90. The nonfoamed concrete building material produced according to the process of claim 70.

91. The nonfoamed concrete building material produced according to the process of claim 71.

92. The nonfoamed concrete buildingmaterial produced according to the process of claim 72.

93. The nonfoamed concrete building material produced according to the process of claim 73.

94. The nonfoamed concrete building material produced according to the process of claim 74.

95. The nonfoamed concrete building material produced according to the process of claim 75.

96. The nonfoamed concrete building material produced according to the process of claim 76.

97. The nonfoamed concrete building material produced according to the process of claim 77.

98. The nonfoamed concrete building material produced according to the process of claim 78.

99. The nonfoamed concrete building material produced according to the process of claim 79.

100. The nonfoamed concrete building material produced according to the process of claim 80.

101. The nonfoamed concrete building material produced according to the process of claim 81.

102. The nonfoamed concrete building material produced according to the process of claim 82.

103. The nonfoamed concrete building material produced according to the process of claim 83.

104. The nonfoamed concrete building material produced according to the process of claim 84.

105. The nonfoamed concrete building material produced according to the process of claim 85.

106. The nonfoamed concrete building material produced according to the process of claim 86.

107. The nonfoamed concrete building material produced according to the process of claim 87.

108. A process for producing a nonfoamed builing material, the process including the following steps:
(a) mixing hydraulic cement and water to form a mixture, said mixing being performed by high shear agitation so as to increase the pH of the aqueous phase formed during the mixing step; and
(b) adding a quantity of reactive silica to said mixture.

109. The process according to claim 108 wherein the hydraulic cement and water are mixed using an HEM Mixer.

110. The process according to claim 108 wherein the reactive silica is selected from the group consisting of fly ash, silica fume, slag cement, glass and mixtures thereof.

111. The process according to claim 108 wherein from about 0.25% to about 100% of reactive silica, by weight of hydraulic cement, is added.

112. The process according to claim 111 wherein from about 10% to about 40% of reactive silica, by weight of hydraulic cement, is added.

113. The product produced according to the process of claim 108.

114. The process of claim 1 wherein a gaseous carbon source is exposed to the mixture of hydraulic cement and water.

115. A process for producing a nonfoamed cementitious product comprising the steps of:
(a) mixing a quantity of hydraulic cement, water, and $CO_2$ provided by a carbon dioxide source, such that a quantity of carbon from the carbon dioxide source is incorporated into and chemically reacts with the mixture of hydraulic cement and water in order to modify the workability of the mixture of hydraulic cement and water, to form a cement paste; and
(b) allowing the cement paste to cure into a cementitious product having no void defects so as to create a substantial reduction in strength of the cementitious product.

116. A process according to claim 115 wherein the carbon dioxide source includes a carbon dioxide enriched atmosphere contiguous to the mixing hydraulic cement and water, said atmosphere including at least 1% by volume $CO_2$.

117. A process according to claim 115 wherein the carbon dioxide source includes a carbon dioxide enriched atmosphere contiguous to the mixing hydraulic cement and water, said atmosphere including at least 5% by volume $CO_2$.

118. A process according to claim 115 wherein the carbon dioxide source includes a carbon dioxide enriched atmosphere contiguous to the mixing hydraulic cement and water, said atmosphere including at least 75% by volume $CO_2$.

119. The process of claim 6 wherein the quantity of carbon incorporated into the building material which chemically reacted with the hydraulic cement and water is increased by the process at least 10% over that present in the cement and water prior to processing.

120. The process of claim 6 wherein the quantity of carbon incorporated into the building material which chemically reacted with the hydraulic cement and water is increased by the process at least 100% over that present in the cement and water prior to processing.

121. The process of claim 11 wherein formation of the gelled mixture is induced by decreasing the pH of the mixture of hydraulic cement and water by at least 0.1 pH units.

122. The process according to claim 32 further comprising the step of allowing the mixture of hydraulic cement and water to cure and wherein the quantity of carbon from the carbon source incorporated into the cured mixture which chemically reacted with the hydraulic cement and water is increased at least 10%.

123. The process according to claim 32 further comprising the step of allowing the mixture of hydraulic cement and water to cure and wherein the quantity of carbon from the carbon source incorporated into the cured mixture which chemically reacted with the hydraulic cement and water is increased at least 100%.

124. A nonfoamed cementitious material prepared by first, combining hydraulic cement and water and second, increasing the carbon content of the combining hydraulic cement and water by greater than 10% at an age at least 1 hour after combining the hydraulic cement and water, said greater than 10% increase in carbon content arising from carbon incorporated into and chemically reacted with the hydraulic cement and water which originated from at least one carbon source selected from the group consisting of $CO_2$, CO, air enriched by a carbon source, and mixtures thereof in order to modify the workability of the cementitious material.

125. A nonfoamed cementitious material prepared by first, combining hydraulic cement and water to form a mixture and second, increasing the carbon content of the mixture of hydraulic cement and water by greater than 100% at an age at least 1 hour after combining the hydraulic cement and water, said greater than 100% increase in carbon content arising from carbon incorporated into and chemically reacted with the hydraulic cement and water which originated from at least one carbon source selected from the group consisting of $CO_2$, CO, air enriched by a carbon source, and mixtures thereof, in order to control the workability of the cementitious material.

126. A process for producing a nonfoamed concrete building material from cementitious materials, the process comprising the steps of:

mixing a quantity of hydraulic cement and water to form a mixture of hydraulic cement and water; and exposing a carbon source to the mixture prior to initial set, wherein at the one hour age the mixture of hydraulic cement and water has an increased carbon content of at least 10% over the carbon present in the quantity of hydraulic cement and water in order to increase the strength of the nonfoamed building material.

127. A process for producing a nonfoamed concrete building material from cementitious materials, the process comprising the steps of:

mixing a quantity of hydraulic cement and water to form a mixture of hydraulic cement and water; and exposing a carbon source to the resulting mixture prior to initial set, wherein at the one hour age the mixture of hydraulic cement and water has an increased carbon content of at least 100% over the carbon present in the quantity of hydraulic cement and water in order to increase the strength of the nonfoamed concrete building material.

128. The process of claim 71 wherein the quantity of carbon incorporated into the building material is increased by at least 10% over that present in the quantity of hydraulic cement and water prior to mixing.

129. The process of claim 71 wherein the quantity of carbon incorporated into the building material is increased by at least 100% over that present in the quantity of hydraulic cement and water prior to mixing.

130. The process of claim 76, wherein formation of the gelled mixture is induced by decreasing the pH of the mixture of hydraulic cement and water by at least 0.1 pH units.

131. A process for producing an improved nonfoamed concrete building material comprising the steps of:

(a) mixing a quantity of hydraulic cement and water;

(b) adding a weak acid to the mixture of hydraulic cement and water, prior to initial set; and (c) allowing the mixture of hydraulic cement and water in order to control the workability of the mixture from step (b) to form a gelled mixture.

132. The process of claim 131 further including the step of subjecting the gelled mixture to a localized stress.

133. The process of claim 131, wherein formation of the gelled mixture is induced by decreasing the pH of the mixture of hydraulic cement and water by at least 0.1 pH units.

134. The process according to claim 131 wherein the weak acid is selected from the group consisting of carbonic acid, sulfuric acid, acetic acid, hydrochloric acid, and mixtures thereof.

135. The process according to claim 111, wherein from about 5% to about 60% of reactive silica, by weight of hydraulic cement, is added.

136. The process according to claim 111, wherein from about 10% to about 40% of reactive silica, by weight of hydraulic cement, is added.

137. A process for producing an improved nonfoamed building material, the process comprising:

combining a quantity of hydraulic cement, water, and a gaseous carbon source such that a quantity of carbon from the carbon source contacts and reacts with a substantial quantity of an aqueous phase formed by combining the hydraulic cement and water prior to initial set in a high shear energy mixing process.

138. A process for accelerating the rate of cure and hydration of a nonfoamed hydraulic cement paste formed by first, mixing water and a quantity of hydraulic cement and second, exposing mixing water and hydraulic cement to a carbon source selected from the group consisting of $CO_2$, CO and mixtures thereof prior to initial set such that a quantity of carbon from the carbon source is incorporated into and chemically reacts with the mixture of hydraulic cement and water so as to accelerate the rate of cure and hydration of the hydraulic cement paste.

139. A process for producing nonfoamed concrete building material, the process comprising:

(a) mixing hydraulic cement and water by a high shear energy mixing process to form a cement paste;

(b) exposing a carbon source to the mixing hydraulic cement and water while mixing the cement paste by a high shear energy mixing process in order to increase the exposure of the cement paste to the carbon source such that a quantity of carbon from the carbon source is incorporated into and chemically reacts with the mixing hydraulic cement and water, the carbon source selected from the group consisting of $CO_2$, CO, $CO_2$ enriched air, and mixtures thereof, wherein said steps (a) and (b) occur during mixing, prior to initial set.

* * * * *